Aug. 28, 1928.
C. P. BROCKWAY
1,682,477
PISTON RING OR ASSEMBLY
Filed July 27, 1922
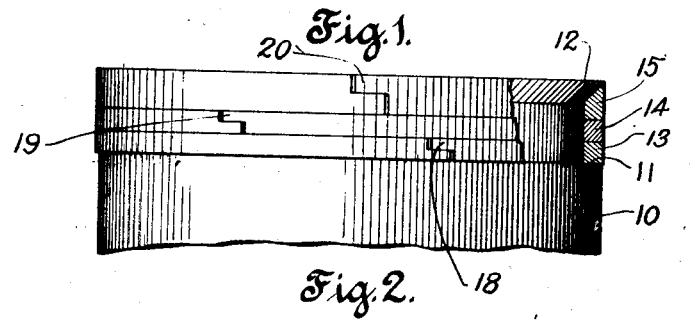
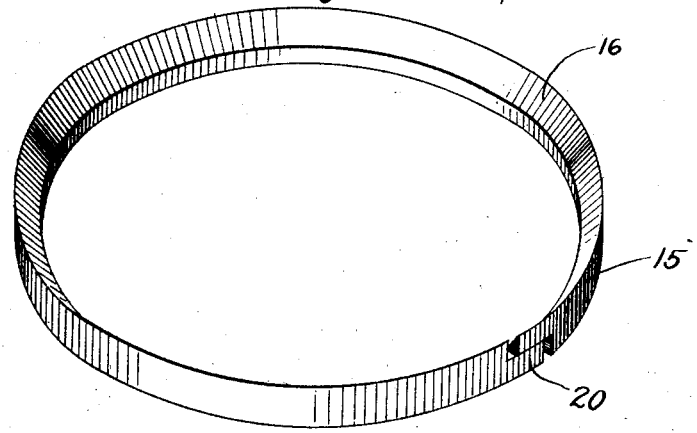
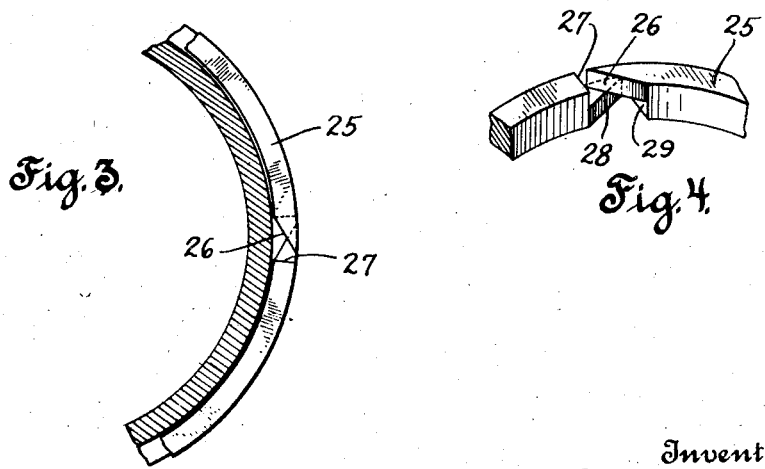
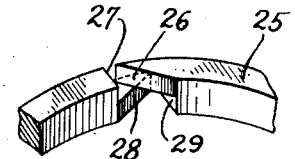
Inventor
Carl P. Brockway
By his Attorney
Chester H Braselton Patented Aug. 28, 1928.

1,682,477

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

PISTON RING OR ASSEMBLY.

Application filed July 27, 1922. Serial No. 577,842.

The present invention relates to means incorporated in a piston ring or in the piston ring assembly, to prevent binding or interference is use, caused by an accumulation of carbon upon contraction of the parts when used in an internal combustion engine and a subsequent expansion in order to facilitate the proper functioning and expansion into position in use to prevent on the one hand an escape of gas past the piston upon compression or on the other hand the passage of oil between the piston and cylinder.

An object of the invention is therefore to provide a means which will prevent an improper accumulation of carbon either between a piston ring and the groove in a piston or between the expanding and contracting ends of a piston ring which interferes with a free, proper and accurate functioning of the piston ring upon continued use, thereby greatly facilitating the action of an internal combustion engine as a whole, and rendering unnecessary frequent inspection and cleaning and breaking of piston rings in a piston ring assembly.

A further object of the present invention is to provide a means which may act in a manner to tend to dislodge an accumulation of carbon by reason of the inherent construction of the piston ring or coaction between a piston ring and the piston or other part upon which a ring may be mounted, the invention having utility in use with "junk" rings such as are used in Knight type engines or other engines and the construction is not limited to its application to the piston ring itself.

A further object of the present invention is to provide a means such as an inclined plane, a sliding surface or wedging action, in a construction of the character indicated to facilitate, or to permit further, relative movement of the parts in action where a ring of the character indicated is employed.

Various other objects are within the scope of this invention such as relate to the arrangement of the related elements or the structure, and to various details of construction and to economies of manufacture and numerous other features as will be apparent from consideration of the drawing and related description of a form of the invention, which may be preferred, in which—

Fig. 1 is an elevation, partly in section, of one embodiment of the present invention shown applied to a piston.

Fig. 2 is a perspective view of one of the piston rings shown in Fig. 1.

Fig. 3 is a sectional view through a piston showing the invention applied to the ring per se, the ring being shown in plan view, while;

Fig. 4 is a perspective view of the meeting edges of the ring illustrated in Fig. 3.

In Fig. 1 I have shown a piston 10 provided with a piston ring groove 11, the upper transverse edge of which is bevelled as indicated at 12. The piston is provided in the present instance with a plurality of rings 13 and 14 and with a specially designed ring 15, illustrated in Fig. 2, the upper transverse edge of which is bevelled as indicated at 16 to cooperate with the bevelled surface 12 of the piston ring groove.

Each of the piston rings 13, 14 and 15 may be of any type and said rings are shown as split rings with the meeting edges off-set as shown at 18, 19 and 20 of Fig. 1.

From an inspection of the structure disclosed it will be seen that if carbon or any other foreign substance accumulates as occurs in the use of an internal combustion engine, the bevelled surfaces 16 and 12 cooperate to produce the advantageous functions hereinbefore indicated. If the meeting surfaces were square, one face to face with the other, upon a relative expansion of the two parts in different amounts, it would be difficult if not impossible for the ring 15 to expand as the same would bind vertically between the ring and the groove. By providing the inclined sliding surfaces it will be seen that upon a different expansion of the piston and ring, the ring may readily slide on the inclined surface, notwithstanding an accumulation of carbon particles between the surfaces 12 and 16. Moreover the construction operates to tend to be self-cleaning or tends to dislodge the carbon particles which form as the sliding action between the surface 16 and the bevelled surface 12 upon contraction or expansion will accomplish this function as will be readily understood.

Referring to the construction illustrated in Figs. 3 and 4, it will be seen that I have provided the meeting edges of a split piston ring 25 with a bevelled portion 26 for a portion of the height thereof, adapted to meet the wall 27 of the other end of the piston ring 25. The lower half of the end 27 of the ring 25 is likewise provided with a bevelled surface 28, portions 26 and 28 overlapping as shown and the portion 28 coming opposite the squared portion 29 of the other end of the ring 25. The action of this adaptation of the present invention will be understood from the foregoing description of the embodiment of the invention illustrated in Figs. 1 and 2. Thus if carbon particles accumulate between the meeting edges of a split ring such as edges 18, 19 and 20, illustrated in Fig. 1, and if incorporated therein, the construction illustrated in Figs. 3 and 4 functions so that as the piston expands and contracts it will not contact with the dead block or wall of carbon accumulated between the meeting edges of the split ring but the bevelled surfaces 26 and 28 thereby will readily permit a sliding action as the split ring expands or contracts. The bevelled edges will also tend to provide a means which will force or push the particles of carbon out of the joint between the split ring either toward or away from the cylinder wall.

It will be noted that by having the wedge or inclined surface illustrated in Fig. 4 the meeting edges of the split ring have portions overlapping as is desirable to prevent the escape of gas or transverse passage of too much oil past the piston ring.

It is to be understood that the groove or retaining means for holding a piston ring such as illustrated in Fig. 4 could be provided with a surface adapted to cooperate with both or either of the inclined surfaces 26 and 28. It is likewise to be understood that a piston ring 25 could be provided with surfaces 26 and 28 extending entirely throughout the height of the ring, or that other overlapping means could be employed therewith.

It is to be understood that in connection with the employment of several rings 13 and 14 in Fig. 1, with the ring 15, the same could be modified so as to embody the principles of the present invention.

It is apparent that, within the spirit of the invention modifications and different arrangements may be made other than as herein disclosed, and the present disclosure is illustrative merely, the invention comprehending all variations thereof.

Having thus described my invention what I desire to secure by Letters Patent of the United States and claim is:—

1. A piston ring for pistons of internal combustion engines, comprising a split ring adapted to be placed in a ring retaining groove of said piston, each of the ends of said ring having a bevelled surface and a non-bevelled surface, the bevelled surface of one end terminating adjacent the non-bevelled surface of the other end and forming a cavity therewith.

2. A piston ring for pistons of internal combustion engines comprising a split ring adapted to be placed in a ring retaining groove of said piston and having curved inner and outer edges, each of the adjacent ends of said ring having a flat formation, the surface of which lies approximately in a plane drawn through the ring axis, and having a forward projecting member, the outer surface of which is curved, and the end of which is approximately in contact with the flat end surface of the opposite end of the ring, the inner surface of said member being inclined from the lower edge of its supporting end to the outer edge of the projecting member.

3. In a piston ring adapted for use on pistons of internal combustion engines comprising a split ring having flat ends, the surfaces of which lie approximately in radial planes passing through the ring axis, said ring ends being also provided with approximately triangular members projecting in extension of said ends to form side contacting members, the outer edges of which being approximately in the outer circumference of the ring, the side edges of which bear one on the other, and the inner edges of which defining with the opposing ring end surface an angular cavity opening toward the ring interior.

In testimony whereof, I affix my signature.

CARL P. BROCKWAY.